United States Patent [19]

Joynt

[11] Patent Number: 5,680,791
[45] Date of Patent: Oct. 28, 1997

[54] FLUID LEVEL MONITOR

[75] Inventor: Thomas King Joynt, Milford, Mich.

[73] Assignee: General Motors Corporation, Detroit, Mich.

[21] Appl. No.: 520,119

[22] Filed: Aug. 28, 1995

[51] Int. Cl.⁶ .................................................. G01F 23/00
[52] U.S. Cl. .......................... 73/290 R; 73/323; 116/227
[58] Field of Search ........................ 116/227; 73/290 R, 73/290 B

[56] References Cited

U.S. PATENT DOCUMENTS

| | | | |
|---|---|---|---|
| 3,667,295 | 6/1972 | Skutella | 73/290 R |
| 4,649,746 | 3/1987 | Snow | 116/227 |
| 4,762,000 | 8/1988 | Bond, Jr. | 73/290 R |
| 4,831,877 | 5/1989 | Snow | 116/227 |

*Primary Examiner*—Ronald L. Biegel
*Attorney, Agent, or Firm*—Karl F. Barr, Jr.

[57] ABSTRACT

A fluid level detector for determining the level of fluids in motor vehicle components such as engines and transmissions includes a cylinder mounted in parallel to the surface of the fluid. The cylinder has a diameter which spans the fluid range to be monitored and includes a first, open end and a second closed end. A piston is disposed within the cylinder and is biased towards the first end where fluid is admitted to the cylinder interior and can be moved towards the second end under the influence of an actuator. When moved, the openings in the cylinder are blocked by the piston to thereby trap the fluid in the cylinder. As the piston continues to move towards the closed end of the cylinder, air above the fluid surface is exhausted through an orifice. Once the air is exhausted from the cylinder, fluid exits the orifice resulting in an increase in operator effort required to move the piston. The transition point between air and fluid flow through the orifice is representative of the fluid level in the component.

1 Claim, 3 Drawing Sheets

FLUID LEVEL MONITOR

TECHNICAL FIELD

The invention relates to detection of fluid levels in a motor vehicle.

BACKGROUND

Proper maintenance of an automotive powertrain requires, among other things, that the engine and transmission oils be maintained at proper levels to ensure adequate lubrication and cooling of vital, internal parts. Typically, the operator is required to access the engine compartment of the motor vehicle where a fluid level dipstick is located for determining engine oil level and, in the case of vehicles with automatic transmissions, the transmission fluid level. Access to the engine compartment is, in the case of many vehicle operators, an undesirable activity with the result that vital fluid levels may not be checked frequently. In addition, with extended vehicle service intervals, the likelihood that the engine compartment will be accessed for reasons other than the checking of fluid levels is lessened. The end effect of the above is that the use of traditional engine mounted dipsticks may no longer provide the optimum vehicle for fluid level maintenance.

Electronic sensors have been proposed which monitor fluid levels throughout the motor vehicle. Substantial concerns may arise as to the long term reliability of such devices. As a result, vehicle manufacturers may recommend that fluid levels be routinely checked through the engine compartment dipstick with the electronic level sensors relegated to emergency, or backup devices.

SUMMARY

The present invention is directed to a device for monitoring the level of fluids in motor vehicle components such as engines and transmissions. The device allows the operator to manually determine the oil level in the component from a remote location. The fluid level detector includes a cylinder having an open end and a closed end. A piston is disposed in the cylinder for reciprocable motion when acted upon by the operator through an actuator. The cylinder assembly described, is disposed within the fluid sump such that the cylinder diameter is normal to the surface of the fluid and encompasses the fluid level range to be monitored. The open end of the cylinder allows fluid to fill the length of the cylinder to a level corresponding to the level of the fluid in the sump. Operation of the actuator moves the piston into the cylinder, trapping the fluid within the cylinder and forcing the trapped air, above the fluid to exit through an orifice located adjacent the closed end, along the uppermost portion of the cylinder relative to the fluid level. As the piston is drawn towards the closed end of the cylinder, the level of the fluid trapped between the cylinder and the piston continues to rise until the air is exhausted and fluid begins to exit the cylinder orifice. Due to the significant difference in viscosity number between air and fluids such as engine oil or transmission fluid, the resistance to flow through the orifice of the fluid is significantly higher than for the air resulting in an increase in resistance to the operator transmitted through the actuator. The point at which increased resistance is encountered will vary depending on the level of fluid in the vehicle component and, as a consequence the level of fluid in the cylinder. The higher the fluid level, the smaller the quantity of air to be exhausted through the orifice and the sooner the encounter with increased resistance to piston actuation. Conversely, a low fluid level will translate to a small quantity of fluid in the cylinder and a large quantity of air, resulting in a longer period of actuation prior to expulsion of the air and subsequent encounter with increased resistance to piston actuation. Calibration of the actuator to relate to the fluid level with the increased resistance to actuation provides a remote, positive, mechanically derived indication of the fluid level within the component being tested.

DESCRIPTION OF THE PREFERRED EMBODIMENT

Figure 1:
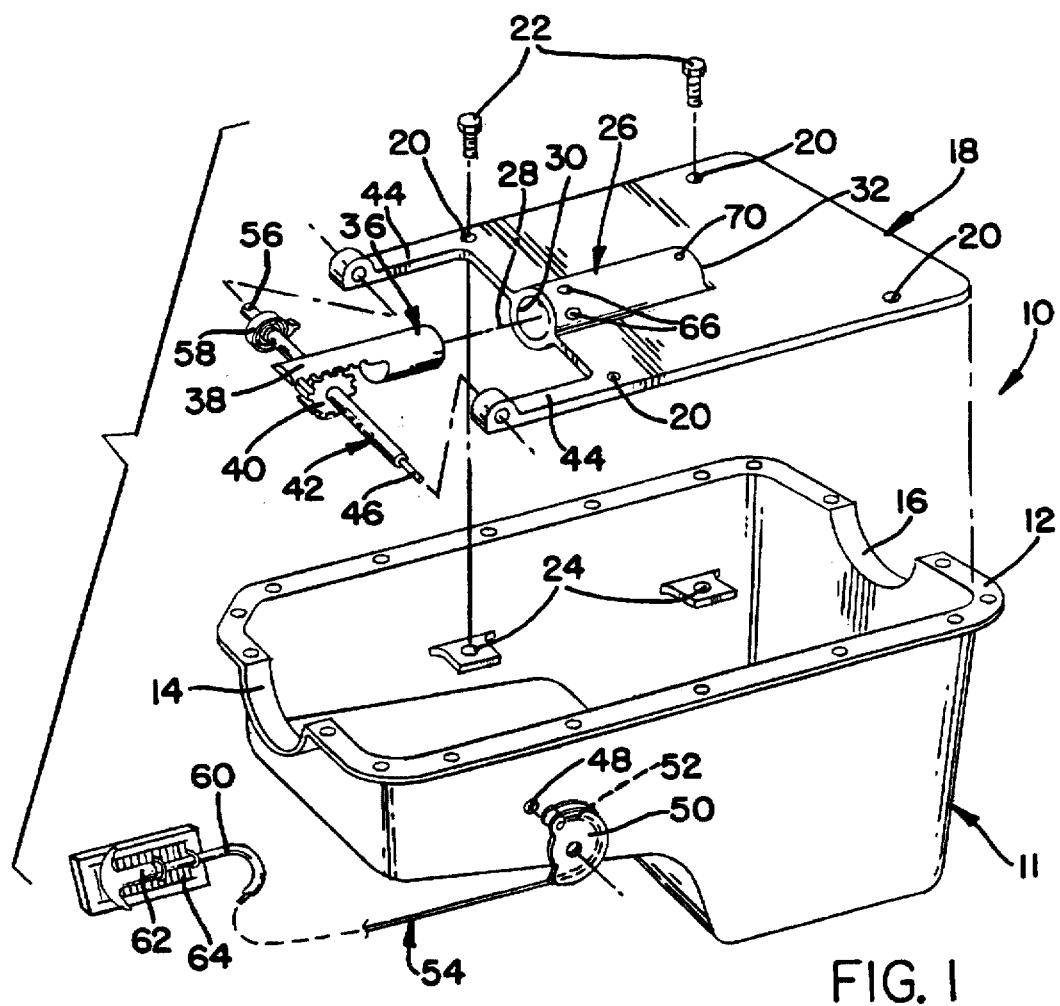
FIG. 1 is an expanded view of an engine oil pan assembly embodying features of the fluid level monitor of the present invention.

FIG. 1 illustrates an oil pan or sump assembly, designated generally as 10, for use as an oil reservoir on an internal combustion engine. Assembly 10 includes an oil pan 11 having a seal flange 12 which mates with a corresponding flange (not shown) on the lower surface of an engine crankcase. Semi-circular seal openings 14,16 at each end of the pan 11 provide clearance for an engine crankshaft. In order to provide clearance for the rotation of the crankshaft, engine oil does not typically fill the entire oil pan 11 but, has an optimum range, operation outside of which can cause engine damage.

Figure 2:
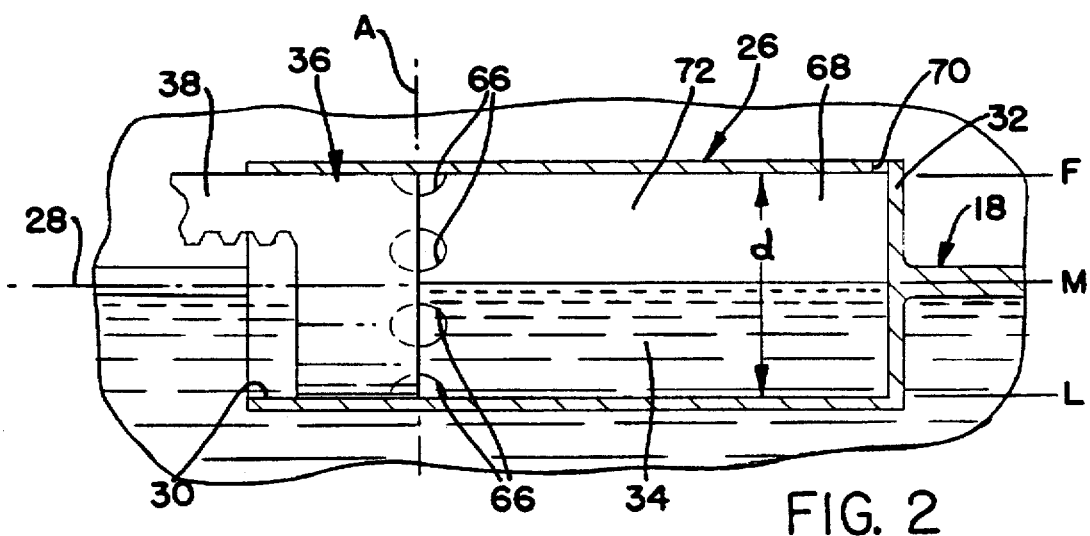
FIGS. 2, 3 and 4 are schematic views taken through the cylinder assembly of the fluid level monitor of the present invention illustrating various modes of operation.
Figure 3:
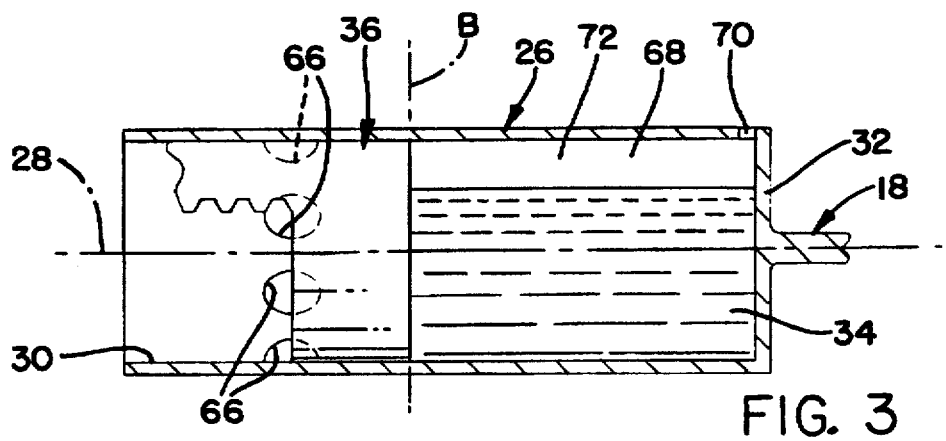
Figure 4:
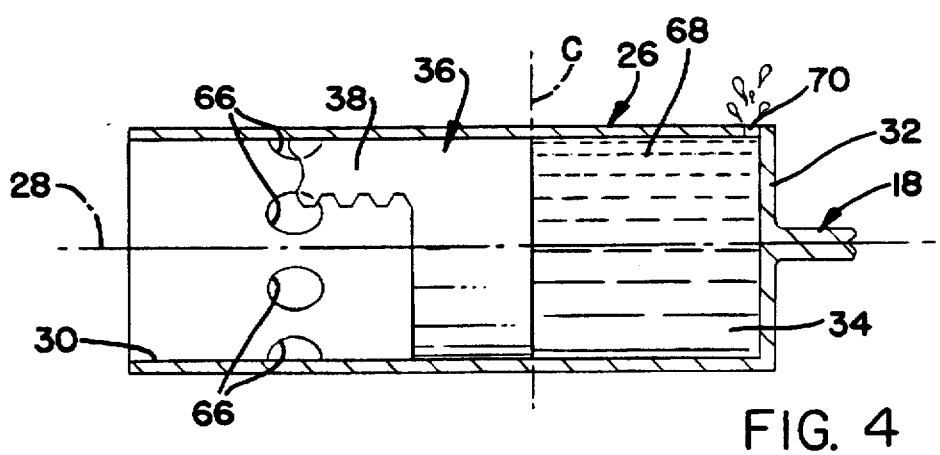
Figure 5:
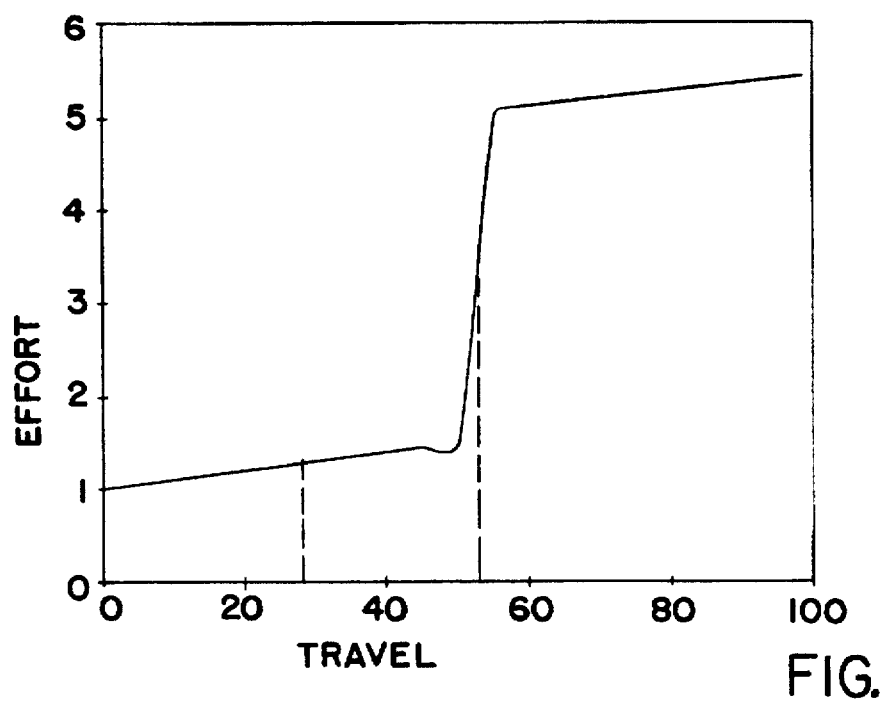
FIG. 5 is a graphical representation of the operation of the fluid level monitor of the present invention.

Within the oil pan 11 is mounted an oil baffle assembly 18 which is useful to control oil movement within the pan thus assuring a constant supply of lubricant to the engine oil pump pickup. The baffle assembly 18 has several openings 20 for accepting fasteners 22 which secure the assembly to mounting steps 24 on the inside of the pan 11. In the embodiment shown, the baffle assembly 18 is preferably mounted within the oil fill range of the oil pan 11. Integral with the oil baffle assembly 18 is a cylinder assembly 26 defining a longitudinal axis 28, FIG. 2, and having a first, open end 30 and a second, closed end 32. The cylinder 26 is configured such that its axis 28 lies parallel to the surface of the oil in the oil pan 11.

A piston 36 is disposed for longitudinal movement within the cylinder 26. In the embodiment shown in FIG. 1, the piston 36 includes an integral rack portion 38 which extends out of the cylinder 26 for engagement with a pinion gear 40 mounted on shaft 42. Rotation of the shaft 42 will cause the pinion gear 40 and cooperating piston rack 38 to move the piston 36 within the cylinder 26. The shaft 42 is supported along its length by openings in arm portions 44, integral with baffle 18. First end 46 of shaft 42 passes through an opening 48 in the oil pan 11 and accepts a cam lever 50 attached to a first end 52 of cable 54. Second end 56 of the shaft 42 includes a return spring 58 which operates to rotate the shaft and position the piston 36 adjacent the open end 30 of the cylinder 26.

The second end 60 of the cable 54 is remotely mounted in a location convenient to the operator. Such locations may include the interior glove compartment, the fuel fill location, or an easily accessible location within the engine compartment. The second end 60 of the cable 54 may include a handle 62 and a scale 64 graduated to indicate fluid level to the operator.

Referring to FIGS. 2-5, the cylinder diameter "d" preferably reflects the range of desirable fluid levels. Optimally, the cylinder is positioned within the fluid reservoir such that the mid-range "M" of acceptable fluid levels lies along axis 28 with the upper "F" and lower "L" acceptable levels at the upper and lower extremes of the cylinder opening 30. The cylinder 26 includes fluid inlet openings 66 which extend around the perimeter and are positioned at an axial location along the cylinder such that oil 34 can flow into the cylinder interior 68, defined between the piston 36 and the closed end 32 when the piston is in its fully retracted position "A", shown in FIG. 2, under the influence of the return spring 58. An orifice 70 is located adjacent to the closed, second end 32 of the cylinder 26 at the uppermost portion thereof, with respect to the oil 34 in the oil pan 11.

To actuate the device, the operator pulls the handle 62 located on the second end 60 of the cable 54. As the handle and attached cable are withdrawn, the cam lever 50 imparts a rotary motion to shaft and pinion gear 42 and 40 which, in turn, acts on the rack portion 38 of the piston 36 to thereby move the piston in the direction of the closed, second end 32 of the cylinder 26 against the opposing force of the return spring 58. As the piston 36 moves within the cylinder 26, the fluid openings 66 are blocked, fixing the quantity of fluid 34 within the cylinder, FIG. 3. Continued withdrawal of the handle 62 results in movement of the piston 36 towards the second end 32, the expulsion of air 72 above the oil 34 in the cylinder 26 through the orifice 70, and an increase of the level of oil within the cylinder. Referring to the graph of FIG. 5, in this mode of operation, the effort required to withdraw the handle 62 is relatively low due to the low viscosity of air and its resultant low resistance to flow through the orifice 70. Upon complete expulsion of the air 72 from cylinder interior 68 and continued withdrawal of handle 62 by the operator, fluid 34 exits the orifice 70, FIG. 4. At this piston position, represented as "C" in FIGS. 4 and 5, operator effort required to continue withdrawal of the handle increases due to the higher viscosity of the fluid 34 and resulting higher resistance to flow through the orifice 70. The transition between air 72 and fluid 34 flow through the orifice 70, represented by an increase in operator effort required to withdraw the handle 62, and attached cable 54, indicates fluid level within the oil pan 11. Long travel of the piston 36 in the cylinder 26 to exhaust the air 72 above the fluid 34 in the cylinder interior 68 indicates a low fluid level while a short piston travel indicates the fluid level is in the upper region of the operating range. Failure to meet any increase in resistance would, consequently, indicate that the fluid level is below the minimum acceptable range "L" resulting in the cylinder containing only air, while failure to meet any low effort resistance would indicate that the fluid level is above the maximum acceptable operating range "F" resulting in the cylinder containing only fluid 34.

Figure 6:
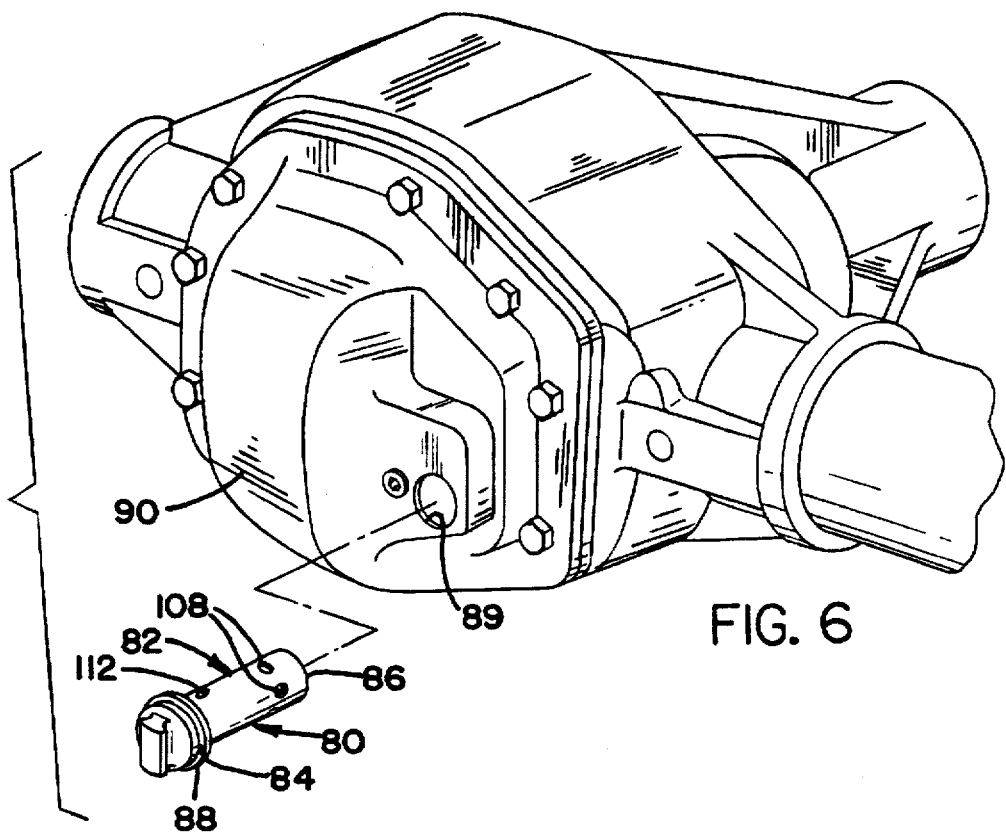
FIG. 6 is a partially expanded view of a fluid containing a housing including a second embodiment of the fluid level monitor of the present invention.
Figure 7:
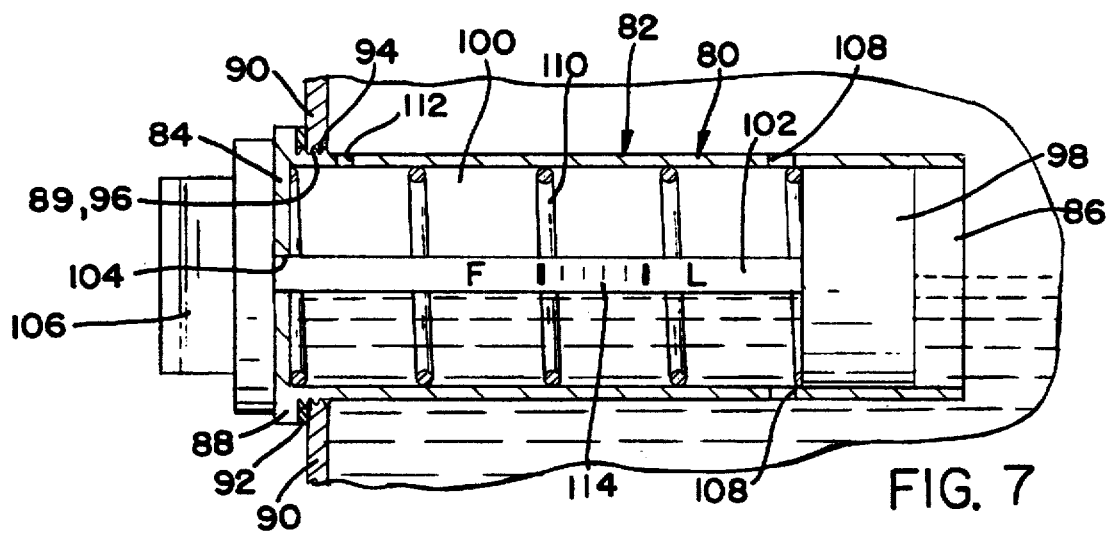
FIG. 7 is a schematic view taken through the cylinder assembly of the fluid level monitor of FIG. 6.

While the fluid detection assembly of the present invention has been described with respect to a particular embodiment, as described above, it should be recognized that the features of the device may be incorporated into a number of fluid containing components with a number of configurations. As an example of such alternative embodiments contemplated by this disclosure, FIGS. 6 and 7 illustrate a simplified fluid level detector, designated generally as 80, which requires access to the component in order to check the fluid level. The detector 80 includes a longitudinally extending cylindrical member 82 having a closed end 84 and an opened end 86. The closed end has a radially extending sealing collar 88 extending thereabout which operates as a stop when the cylinder is inserted into an opening 89 in the housing 90 of a fluid containing component. A resilient sealing member, such as o-ring 92 is disposed between the collar 88 and the housing to provide a leak tight fit therebetween. The cylinder 82 may be held in place through the use of an external clamping member or it may include external threads 94 which engage corresponding internal threads 96 in the housing opening 89. Piston 98 resides near the open end 86 of the cylinder 82 and operates, with respect to the closed end 84 of the cylinder, to define cylinder interior 100. Actuating rod 102 extends from the piston 98 longitudinally through opening 104 in the closed end 84 where it exits the cylinder. The rod 102 may be connected to an actuator such as knob 106. In operation, fluid in the component enters the cylinder interior 100 through openings 108 extending about the perimeter thereof. Actuation of the unit by the operator involves pulling on the actuator knob 106 so as to withdraw the rod 102 from the cylinder 82 through opening 104. As the rod 102 is withdrawn, piston 98 is urged, against the action of return spring 110, towards the closed end 84 of the cylinder 82. Operation of the unit with respect to the fluid and air exiting the orifice 112 is the same as that described above. A scale 114 may be printed on the rod 102 to assist the operator in determining the fluid level within the component.

The present invention discloses an assembly which allows positive, mechanical determination of fluid levels within a fluid containing component such as the engine or transmission of an automobile. The device is capable of operating remotely from the component thereby minimizing operator involvement. In addition, the present design dispenses with the need to contact the fluid when determining levels thereby avoiding the risk of spillage, contamination and soiling of the operator.

I claim:

1. An apparatus for determining the level of oil in the sump of an internal combustion engine, comprising a baffle assembly including a baffle plate mounted within said sump, said baffle plate extending parallel to the engine oil and within a range of operating oil levels of said engine, said baffle plate including a cylinder, having a diameter defining a longitudinal axis, said axis extending parallel to the engine oil surface, and said diameter extending normal to the engine oil surface across the range of said operating oil levels of said engine, said cylinder further comprising a first, open end, a second, closed end, a piston disposed for longitudinal motion within said cylinder, said piston normally biased towards said first, open end to admit engine oil through openings in the perimeter of said cylinder, adjacent to said first, open end thereof, to define a first region of engine oil representative of the oil level in the sump, in said cylinder and a second region of air above said engine oil, an actuator associated with said piston and operable to move said piston towards said second closed end of said cylinder to block said openings in the perimeter of said cylinder, said cylinder further comprising an orifice through which air may pass from said second region of air as said piston is moved towards said second end and through which engine oil may pass as the air in said second region is exhausted, wherein engine oil level in said sump is determined at the transition from air to engine oil passing through said orifice.

\* \* \* \* \*